United States Patent
Waite et al.

(10) Patent No.: US 12,326,972 B2
(45) Date of Patent: Jun. 10, 2025

(54) SACCADE DRIVEN TEXT COMPREHENSION ARTIFICIAL INTELLIGENCE ENGINE

(71) Applicant: INTERNATIONAL BUSINESS MACHINES CORPORATION, Armonk, NY (US)

(72) Inventors: Tyler Waite, Lake Washington, WA (US); Jason Andrew Telner, Lackawanna, NY (US); Jon Gerard Temple, Southbury, CT (US); Peter Guzewich, Vestal, NY (US); Donna Thelander, Kailua Kona, HI (US); Mark Willard Malatesta, Ortonville, MI (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 18/181,299

(22) Filed: Mar. 9, 2023

(65) Prior Publication Data
US 2024/0302895 A1    Sep. 12, 2024

(51) Int. Cl.
| | |
|---|---|
| G06F 3/01 | (2006.01) |
| G06F 3/0481 | (2022.01) |
| G06F 3/04842 | (2022.01) |
| G06F 9/451 | (2018.01) |
| G06N 20/00 | (2019.01) |

(52) U.S. Cl.
CPC ............ *G06F 3/013* (2013.01); *G06F 3/0481* (2013.01); *G06F 9/453* (2018.02); *G06N 20/00* (2019.01); *G06F 3/04842* (2013.01)

(58) Field of Classification Search
None
See application file for complete search history.

(56) References Cited

U.S. PATENT DOCUMENTS

| | | |
|---|---|---|
| 9,256,285 B2 | 2/2016 | Leroy |
| 10,268,264 B2 | 4/2019 | Des Pommare |
| (Continued) | | |

FOREIGN PATENT DOCUMENTS

| | | |
|---|---|---|
| WO | 2022150668 A1 | 7/2022 |

OTHER PUBLICATIONS

Ahn et al., "Towards Predicting Reading Comprehension From Gaze Behavior," ACM, ETRA '20, Jun. 2-5, 2020, 5 pages.

(Continued)

*Primary Examiner* — Ryan Barrett
(74) *Attorney, Agent, or Firm* — Lily Neff

(57) ABSTRACT

A method, computer system, and a computer program product are provided for enabling a user to obtain additional information about a content. In one embodiment, the process starts by collecting, from at least one sensor, eye gazing data relating to eye movement of the user looking at a content. User's saccade rate is calculated based collected eye gazing data. It is determined when the saccade rate falls below a first value of the viewing content of a first area and the location is flagged as a first subset. It determined when the saccade rate shifts backwards over a second subset of the content one or more times and this area is flagged as a second area. The portion of the content located between the first and second flagged areas are emphasized. Explanatory tools are provided relating to content of emphasized portion.

19 Claims, 2 Drawing Sheets

(56) References Cited

U.S. PATENT DOCUMENTS

| | | | |
|---|---|---|---|
| 10,409,366 B2 | 9/2019 | Beri | |
| 10,671,681 B2 | 6/2020 | Cardonha | |
| 10,983,591 B1* | 4/2021 | Ouderkirk | G02B 27/017 |
| 11,003,852 B2 | 5/2021 | Berzak | |
| 11,157,074 B2 | 10/2021 | Contractor | |
| 11,256,326 B2 | 2/2022 | Ding | |
| 11,449,138 B1 | 9/2022 | Giordano | |
| 11,474,599 B2 | 10/2022 | Young | |
| 2011/0206283 A1* | 8/2011 | Quarfordt | G06V 40/193 382/220 |
| 2012/0131491 A1 | 5/2012 | Lee | |
| 2014/0160340 A1* | 6/2014 | Farnand | H04N 23/61 348/333.11 |
| 2014/0361971 A1* | 12/2014 | Sala | G06F 3/013 345/156 |
| 2015/0213634 A1 | 7/2015 | Karmarkar | |
| 2015/0309565 A1 | 10/2015 | Beri | |
| 2016/0217623 A1* | 7/2016 | Singh | G09G 5/00 |
| 2016/0224308 A1 | 8/2016 | Pierce | |
| 2017/0003742 A1 | 1/2017 | Ding | |
| 2017/0329396 A1 | 11/2017 | Des Pommare | |
| 2018/0081973 A1* | 3/2018 | Cardonha | G06F 16/24575 |
| 2018/0232049 A1 | 8/2018 | Thunström | |
| 2018/0314327 A1* | 11/2018 | Digirolamo | G06F 3/013 |
| 2019/0079917 A1 | 3/2019 | Berzak | |
| 2019/0171284 A1 | 6/2019 | Contractor | |
| 2021/0065040 A1* | 3/2021 | Eberlein | G06F 9/451 |
| 2021/0174959 A1* | 6/2021 | Abel Fernandez | G06N 20/00 |

OTHER PUBLICATIONS

Aljaafreh et al. "A Low-cost Webcam-based Eye Tracker and Saccade Measurement System," International Journal of Circuits, Systems and Signal Processing, vol. 14, 2020, https://www.naun.org/main/NAUN/circuitssystemssignal/2020/a302005-amn.pdf, pp. 102-107.

Bryan et al., "Analyzing gaze behavior for text-embellished narrative visualizations under different task scenarios," Visual Informatics, 4 (2020), Available online Aug. 24, 2020, pp. 41-50.

Krieber et al., "The Relation between Reading Skills and Eye Movement Patterns in Adolescent Readers: Evidence from a Regular Orthography," PLOS One 11(1), Jan. 4, 2016, https://www.ncbi.nlm.nih.gov/pmc/articles/PMC4699816/pdf/pone.0145934.pdf, 13 pages.

Newn et al., Demo: Combining Implicit Gaze and AI For Real-Time Intention Projection, ACM, UbiComp/ISWC '19 Adjunct, Sep. 9-13, 2019, pp. 324-327.

Okoso et al., "Towards Extraction of Subjective Reading Incomprehension: Analysis of Eye Gaze Features," ACM, CHI 2015, Apr. 18-23, 2015, pp. 1325-1330.

Origin Instruments, "Sip and Puff Switch Solutions—Single and Multi-User Offerings," Orin, Accessed: Dec. 16, 2022, https://www.orin.com/access/sip_puff/, 19 pages.

Sharma et al., "Eye-tracking and artificial intelligence to enhance motivation and learning," Smart Learning Environments, Springer Open, Apr. 26, 2020, https://slejournal.springeropen.com/articles/10.1186/s40561-020-00122-x, 20 pages.

* cited by examiner

SACCADE DRIVEN TEXT COMPREHENSION ARTIFICIAL INTELLIGENCE ENGINE

BACKGROUND

The present invention relates generally to the field of data management and more particularly to techniques for providing additional information to a user relating to a content using a saccade driven comprehension module.

Many web designers may provide a link or tool tip to provide additional information about a content that may appear on a webpage that may be unknown or unfamiliar to a user. However, it may be impossible to anticipate all the terms that may have to be provided in this context. Consequently, it may be often impossible to provide such a comprehensive list.

The process for a user to find the definition or connotation of a term that may be unfamiliar may not be easy. When there are no associated tool tips, links, or content to provide further clarifications, the users may have to engage in a very slow manual process to acquire such additional information. This process may disrupt the flow of the user's reading or interfere with the performance of necessary tasks. In some instances, the user may need to first move a cursor to the word via a mouse, trackpad or other similar interfaces. Subsequently, the text or interesting part of the document may have to be highlighted, so as to for example allow copying it. Other processes may have to follow too, which may involve but may not be limited to opening a new tab in the browser, pasting a word or sentence in a search field; and ultimately reviewing the search results and selecting a desired link. Ultimately, the page may have to be loaded and the page needs to be scanned for information that may be related to the word that need clarification. In case the term may still remain unclear, the process has to be reiterated. Unfortunately, faced with these time-consuming steps, most users often skip over unfamiliar words and the search process.

SUMMARY

Embodiments of the present invention disclose a method, computer system, and a computer program product for enabling a user to obtain additional information about a content using user's eye movement. In one embodiment, the process starts by collecting, from at least one sensor, eye gazing data relating to eye movement of the user looking at a content. User's saccade rate is calculated based collected eye gazing data. It is determined when the saccade rate falls below a first value of the viewing content of a first area and the location is flagged as a first subset. It determined when the saccade rate shifts backwards over a second subset of the content one or more times and this area is flagged as a second area. The portion of the content located between the first and second flagged areas are emphasized. Explanatory tools are provided relating to content of emphasized portion.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
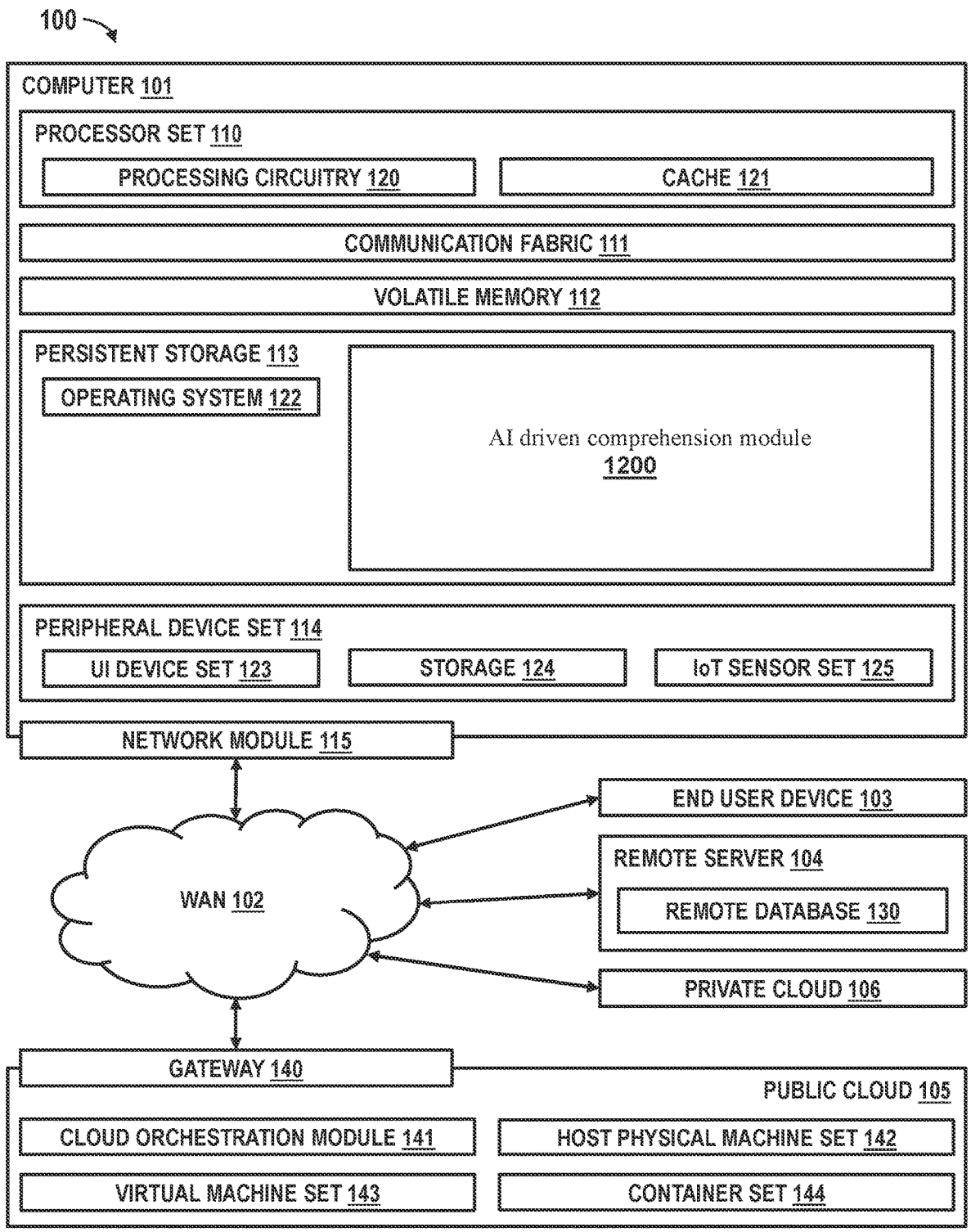
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing an AI driven comprehension module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
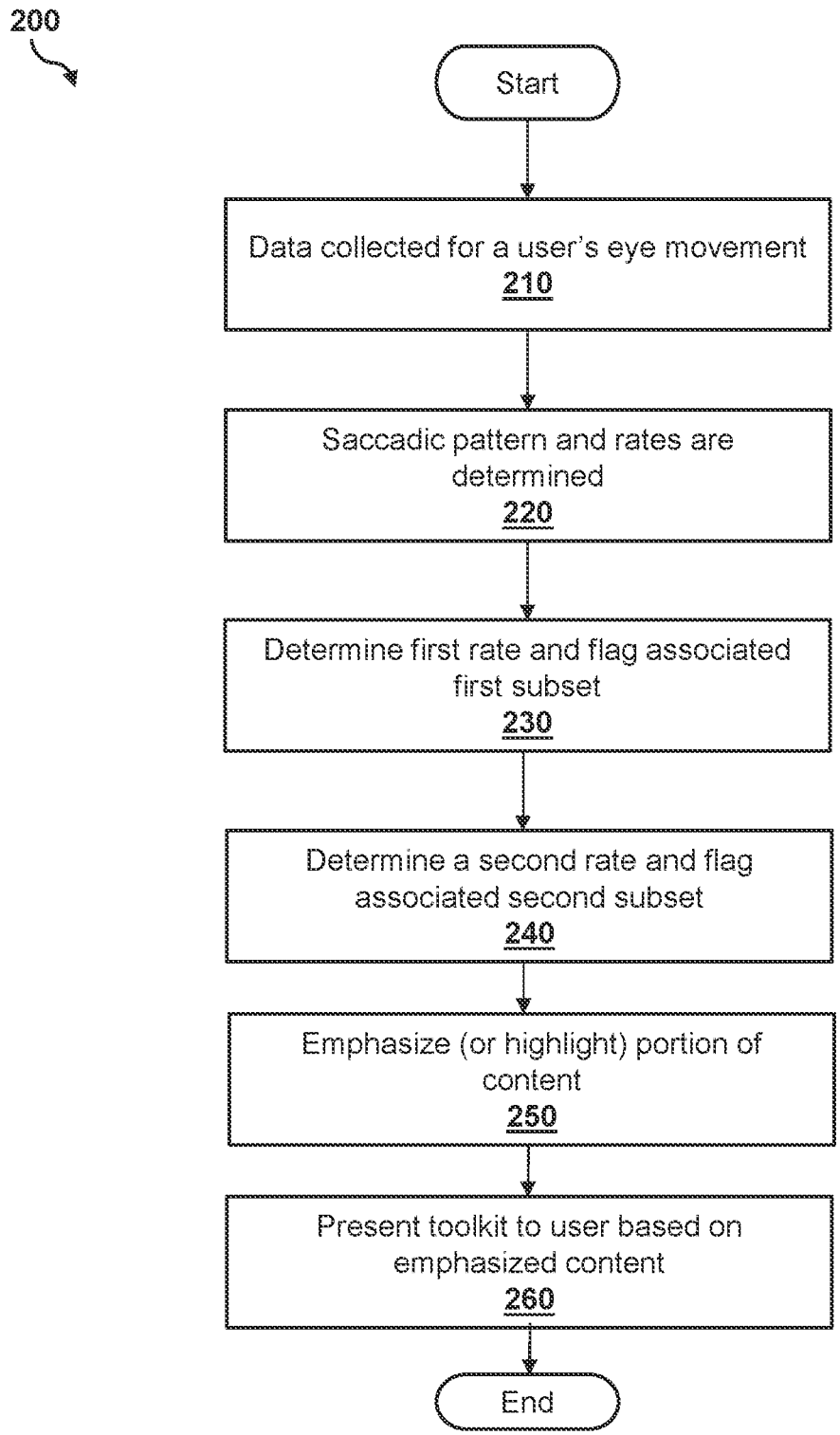
FIG. 2 provides an operational flowchart for providing additional information to a user relating to a content using eye movement data, according to one embodiment.

FIG. 2 provides a flowchart depiction of one embodiment showing a process 200 to provide an AI driven comprehensive module or engine. The process 200 provides the ability to assist a user to dynamically identify a portion of a content and get more information. This can be achieved through the user's eye movement and saccadic rates and patterns. Additional information relating to this content may then be provided to the user, such as through the use of a tooltip. This will allow help to be provided to the user to clarify the portion of the content (without the need to hard code every word on the page a priori). The portion of the content that the user may be struggling with can be a word, a sentence and image, or even videos, etc. When the content is more complex, for example at a sentence level, as opposed to a word level, the eye movement patterns can also be used to diagnose sentence-level comprehension difficulties, and invoke algorithms known to simplify the sentences through word substitutions and grammatical transforms (passive to active, eliminate double negatives, etc.).

In one embodiment, as used in conjunction with FIG. 2, a user may be reading a content. One or more sensors, as will be discussed, will be used to monitor the user's eye movement and gaze. For ease of understanding and simplicity, the content may be a textual content provided on a device, such as a display device. However, in an alternate embodiment, a content can contain images and/or video or streaming contents that include or exclude text.

In Step 210, data may be collected relating to a user's eye movement. In one embodiment, the data may be collected from one or more sensors, relating to the eye-gazing data of a user with respect to text content presented on a display device. Eye tracking or eye gazing processes have gained popularity. As can be appreciated by those skilled in the art, there are a number of different alternative ways to track the eye movement. All these embodiments involve tracking the movement of the eyes. As provided here, in one embodiment, a sensor may be used.

In some embodiments, a tracking system having one or more sensors can be used that measures the eye position, movement, and pupil size at a specific time to detect areas in which the user has an interest. As can be appreciated by those skilled in the art, there many other systems that can be used that provide for eye tracking techniques. In addition, some eye tracking systems use software algorithms for pupil detection, image processing, data filtering, and the recording of eye movements by means of a fixation point, fixation duration, and saccades.

In one embodiment, an Artificial Intelligence (AI) system or module may also be used to train one or more machine language (ML) engines using machine language modeling. AI may apply several other algorithms and techniques such as deep learning to solve actual problems and smartly execute tasks.

In some embodiments, computing capabilities allow machine learning (MIL) algorithms to be integrated with eye tracking devices and learning functionalities from captured data to generate smarter eye tracking devices. Eye tracking sensors may be used to collect and analyze real-world eye tracking data using tools such as heatmaps, gaze replays, and areas of interest (AOI) to generate certain output metrics such as the time to first fixation and time spent. These technologies may even provide automated gaze-mapping from dynamic environments to static scenes for a simpler aggregation and analysis.

In Step 220, using a machine learning (ML) model, saccadic pattern data for a user may be determined and analyzed. This includes calculating the pattern based on the eye gazing data. Simultaneous movement of both eyes is known as a saccade. This is defined as the movement of eyes between two or more phases of fixation in the same direction. This step includes the calculation by a ML model of the saccade rate of the user based on eye gazing data. It also includes inferring by the ML, saccadic pattern data of the user based on analysis of the eye gazing data.

In Step 230, a first subset of an associated location of an original (text) content may be determined and flagged. In one embodiment, the point determining the beginning of the first subset location may be obtained responsive to a change in saccade rate changes. In one embodiment, this will be a saccade rate decrease in general or the falling of the rate below a particular threshold with respect to the rate for viewing the general (original) text content. This will be discussed in greater detail later. In one embodiment, the threshold could be defined as a first value as set by a user or AI. The location of the first subset can also be provided as viewing a first area.

In Step 240, a second subset is flagged. This second subset may be responsive to detecting a saccade that shifts backwards over a second subset of the text content one or more times based on the saccade pattern data. The first subset and the second subset can be a letter or acronym, an image, a word, a pattern or one or more sentences (including one or more words, phrases, images, scenes etc.) In addition, the ML models and AI can be used to determine a difficulty of the sentence etc. based on the saccade pattern data. The location of the first subset can also be provided as viewing a first area.

In Step 250, a portion of the original content may be selected and emphasized. In one embodiment, this may be based on the location of the first and second flagged locations. The selection, in one embodiment can include highlighting of the first flagged subset or the second flagged subset. In one embodiment, the selection may involve the user gazing at the highlighted subset for a predetermined period of time.

In Step 260, one or more tools may be presented to the user based on the highlighted subset. The tooltip can be presented as a consequence of the selected highlighted subset of the text content of the previous step. As can be appreciated by those skilled in the art, a Tooltip can be defined as a variety of different helpful information provided to the user in a variety of ways. In one embodiment, Tooltip appears as any graphical user interface that provides information to the user when the user hovers over an area or content. In one embodiment, the user does not require to click or perform any additional tasks and hovering a user interface over a content or will provide the additional information.

In one embodiment, when the first subset and the second subset each comprise a more involved text that is more than a few words and may include one or more sentences, the explanatory tooltip may include a paraphrase of one or more sentences using one or more simpler words and/or one or more simpler standard grammatical transformations. In addition, in one embodiment, when the first subset and/or the second subset comprises a word, and the tooltip comprises a short definition of the word, one or more synonyms of the word, one or more links to webpages, and/or one or more video or audio examples of the word may be provided.

In one embodiment, when a display device is used, the display device provides the one or more explanatory tooltips with respect to the selected subset of the text content. In one embodiment, the tooltip can be provided as a prompt on the display.

Feedback from users on the accuracy and usefulness of the information presented by, for example a bot will be used to train the ML so as to increase the accuracy of the information presented.

In one embodiment, the user may be solicited (such as through the display device) to provide feedback regarding the tooltip and its efficacy. Further information can then be provided, and the ML model will be updated based on the user feedback. Consequently, one or more portions of suggested content may be generated to provide improvements to reduce the complexity of the text content for one or more other users based on the feedback, the eye-tracking data, the saccadic rate, and/or the saccadic pattern data.

In this way, in one embodiment, a user may be alerted ahead of time when a word that the user may encounter may be unfamiliar to them. When this is the case, even when the user may be struggling with a whole sentence, the user can be helped. In one embodiment, an alert (notification) may be provided to the user and if the user agrees with the alert (highlight area can also be provided), the user may merely have to focus the user's eyes (gaze) on the highlighted portion provided. The tooltip will then be provided to the user along with explanatory and clarifying information, as determined (i.e., collected and refined) by the AI algorithms. Once the user is finished with the information, the user can then simply glance away from the tooltip, and it disappears as their eye movement continues down the page with minimal cognitive disruption.

In one embodiment, an assistive interaction may involve providing real-time assistance to the user by tracking the user's eye movements across a screen, etc. to detect words that slow the user's normal saccade rate.

In one embodiment, when a saccade delay is detected, or a saccade that moves across the same word location multiple times, the AI (ML model) will highlight the word that is slowing the saccade. This may then provide a display of a tooltip, somewhere, for example, above the word that contains synonyms and other information. For example, in one embodiment, this can be a word that score lowers on the Flesch Kincaid scale. (The Flesch-Kincaid readability tests are tests designed to indicate how difficult a passage in English is to understand). A short definition and other options may also be provided that include more information such as a link to a webpage containing visual examples or videos.

In another embodiment, when the eye tracking data indicates backtracking to the start of a sentence, indicating that reading comprehension at the sentence level has slowed, a display will be shown that provides a paraphrase of the same sentence using simpler words and with standard grammatical transformations such as turning passive into active sentences to lower the overall complexity of the sentence.

It should be noted that providing many tooltips on one or more webpages, requires no prior identification of words as necessary. The AI can dynamically build a dictionary of potential tools tips from words scrapped from the webpage, focusing first on words (such as with the highest Flesch Kincaid score) and words that may not be encountered on previous websites.

Different embodiments of the present process can be applicable to different scenarios. For example, this present solution may help people with cognitive impairments, people who may be reading a text that may be in a language that they may not be fully proficient in, or people reading a technical article that have a lot of terms that they are not familiar with. It can also be used by students learning a foreign language by generating a list of terms for the student to practice.

Furthermore, many technology companies create a lot of technical documentation that uses terms that may be likely to be unfamiliar to more novice readers. Such a solution may help new users more rapidly achieve expert level understanding of technology as well as provide data around which terms in use in the technical documentation may be the most problematic and thus in need of being updated for greater clarity. In the global economy, businesses often have a lot of employees and customers whose native language does not match the language in the majority of the corporate documentation.

This reading AI may help people who have a basic level of proficiency in the language the document may be written in to quickly understand unfamiliar words in the document. By tracking the user's eye movements while the user may be reading text on a webpage, this may help the user who is unable to use their hands, because of disability or due to interacting with other devices and components.

An interactive example can now be provided for a sample scenario:

In this scenario, the implementation steps may be as follows:

a. User opens browser with reading bot plugin already installed.

b. Laptop webcam turns on and begins tracking eye movement.

c. User begins reading text on webpage.

d. The system will use eye tracking technology to monitor eye movement across the webpage to establish the reader's saccade rate. Typical saccade rates will be used to establish an initial baseline, but these will be refined based on the user's personal saccade rate.

e. When a saccade rate is significantly below the user's normal saccade rate, or the detection of a saccade that appears to shift backwards and move over a set of words multiple times will be used to flag a set of words to highlight.

f. Once the event has been detected the set of words will slowly begin to be highlighted to alert the user of words that may be unfamiliar. If the user maintains focus on the highlighted words for two full seconds, the explanatory tooltip will appear.

g. If the user does not want to see the tooltip, or is done viewing the tooltip, they can simply shift their gaze away from the tooltip and continuing reading the text on the page.

h. The actual contents of the tooltip may be adjusted for different application scenarios. In one embodiment, the contents may be presented as a short definition or synonyms that are rated at a lower reading comprehension level, and/or links to webpages that can provide more detail and possibly video examples.

i. Alternatively, the saccadic patterns may be used to infer a difficulty at the sentence level as well. For example, eye tracking research has ascertained that backtracking to the start of a sentence may be indicative of reading comprehension problems. A tooltip may be shown that provides a paraphrase of the same sentence using simpler words and with standard grammatical transformations such as turning passive into active sentences to lower the overall complexity of the sentence, make the sentence easier to understand.

j. If the user wants to view the source of the information presented in the tooltip, the user can either click or focus on the "Source" link. This will open the source of the information presented in the tooltip in a new tab in the browser. On the source page the tooltip text will be highlighted.

There will also be a tooltip asking if the information was helpful in order to collect data to help train the AI engine that selects the tooltip source pages. In a profile section of the AI plugin interface the user would be able to see a list of words that they have struggled with so that they can review and practice them later. For the paraphrase scenario the AI algorithm will pull from a built-in thesaurus and use a natural processing language (NLP) module to construct a sentence using words at a lower reading level than the ones where the saccade delays were detected. This can be updated as the time goes by as well, in one embodiment.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing additional information to a user relating to a content, using user's eye movement data, comprising:
    collecting, from at least one sensor, eye gazing data relating to an eye movement of a user looking at a content;
    using an Artificial Intelligence (AI) module to calculate a saccade rate associated with said eye gazing data; wherein said Artificial Intelligence (AI) module uses one or more machine learning models;
    using said AI module to determine a saccade pattern using said saccade rate and an associated saccade pattern data;
    determining when said saccade rate falls below a first value with respect to viewing a first area of said content and flagging a location for a first subset of said content;
    determining when said saccade rate shifts backwards over a second subset and second flagged area of said content one or more times based on said saccade pattern data, and flagging said location as a second area of the content; wherein a shift backward is a movement that gazes at least a second time over a set of words or images;
    emphasizing a portion of said content located between said first and said second flagged areas;
    determining one or more tooltips that can be provided to said user corresponding to information in said content that falls in said emphasized portion;
    determining when a saccade delay is detected and moving across a portion location where the delay is detected a plurality of times using the one or more machine learning models to highlight the portion that is slowing the saccade using the one or more tooltips; and
    determining a difficulty of the one or more sentences based on the saccade pattern data and providing alternatives using said one or more tooltips.

2. The method of claim 1, wherein said emphasized portion is a highlighted portion and selected by said user.

3. The method of claim 2, wherein said content is provided on a display and said highlighted portion is provided to said user on said display.

4. The method of claim 3, further comprising: responsive to the user selecting the highlighted subset of said content, displaying, on a display device, the one or more tooltips with respect to the selected subset of said content.

5. The method of claim 4, wherein at least a portion of said content is a textual content.

6. The method of claim 5, wherein the first subset and the second subset each comprise one or more sentences having one or more words.

7. The method of claim 5, wherein the first subset and the second subset each comprise one or more sentences, and wherein the one or more tooltips comprise a paraphrase of one or more sentences using one or more simpler words.

8. The method of claim 5, wherein the first subset and/or the second subset comprise a word, and the one or more tooltips comprise a short definition of said word.

9. The method of claim 8, wherein said one or more tooltips also include at least one or more synonyms of said word, one or more links a webpage, or one or more audio or video samples.

10. The method of claim 5, further comprising:
    responsive to displaying the one or more tooltips, presenting a prompt on the display device to solicit feedback from the user regarding the one or more tooltips.

11. The method of claim 1, wherein said Artificial Intelligence (AI) module is used to update the machine learning model based on the feedback.

12. A computer system for providing additional information to a user relating to a content using eye movement data, the computer system comprising:
    one or more processors, one or more computer-readable memories and one or more computer-readable storage media;
    program instructions, stored on at least one of the one or more storage media for execution by at least one of the one or more processors via at least one of the one or more memories, to collect from at least one sensor, eye gazing data relating to eye movement of a user looking at a content;
    program instructions, stored on at least one of the one or more storage media for execution by at least one of the one or more processors via at least one of the one or more memories, to calculate a saccade rate associated with said user viewing said content based on said user's eye gazing data collected using an Artificial Intelligence (AI) module;
    program instructions, stored on at least one of the one or more storage media for execution by at least one of the one or more processors via at least one of the one or more memories to determine a saccade pattern using said saccade rate and an associated saccade pattern data using said AI module to calculate a saccade rate associated with said eye gazing data; wherein said Artificial Intelligence (AI) module uses one or more machine learning models;
    program instructions, stored on at least one of the one or more storage media for execution by at least one of the one or more processors via at least one of the one or more memories to determine when said saccade rate falls below a first value with respect to viewing a first area of said content and flagging a location for a first subset of said content;
    program instructions, stored on at least one of the one or more storage media for execution by at least one of the one or more processors via at least one of the one or more memories to determine when said saccade rate shifts backwards over a second subset and second flagged area of said content one or more times based on said saccade pattern data, and flagging said location as a second area of the content;
    wherein a shift backward is a movement that gazes at least a second time over a set of words or images;
    program instructions, stored on at least one of the one or more storage media for execution by at least one of the one or more processors via at least one of the one or more memories to emphasize a portion of said content located between said first and said second flagged areas;

program instructions, stored on at least one of the one or more storage media for execution by at least one of the one or more processors via at least one of the one or more memories to determine one or more tooltips that can be provided to said user corresponding to information in said content that falls in said emphasized portion;

program instructions, stored on at least one of the one or more storage media for execution by at least one of the one or more processors via at least one of the one or more memories to determine when a saccade delay is detected and moving across a portion location where the delay is detected a plurality of times using the one or more machine learning models to highlight the portion that is slowing the saccade using the one or more tooltips; and program instructions, stored on at least one of the one or more storage media for execution by at least one of the one or more processors via at least one of the one or more memories to determine a difficulty of the one or more sentences based on the saccade pattern data and to provide alternatives using data and to provide alternatives using said one or more tooltips.

13. The computer system of claim 12, wherein said Artificial Intelligence (AI) module, uses one or more machine learning models.

14. The computer system of claim 12, wherein the program instruction to emphasize said portion is highlighted and selected by said user.

15. The computer system of claim 14, wherein the program instruction to provide said content is shown on a display and said highlighted portion is provided to said user on said display.

16. The computer system of claim 15, further comprising:
program instructions, stored on at least one of the one or more storage media for execution by at least one of the one or more processors via at least one of the one or more memories to select, responsive to the user, the highlighted subset of said content, displaying, on a display device, the one or more tooltips with respect to the selected subset of said content.

17. The computer system of claim 12, further comprising:
program instructions, stored on at least one of the one or more storage media for execution by at least one of the one or more processors via at least one of the one or more memories to display the one or more tooltips, and present a prompt on the display device to solicit feedback from the user regarding the one or more tooltips.

18. The computer system of claim 17, wherein said Artificial Intelligence (AI) module updates said saccade rate and pattern using one or more machine learning models based on the feedback.

19. A computer program product for providing additional information to a user relating to a content using eye movement data, the computer program product comprising:

one or more computer readable storage media;

program instructions, stored on at least one of the one or more computer storage media, to collect, from at least one sensor, eye gazing data relating to eye movement of a user looking at a content;

program instructions, stored on at least one of the one or more computer storage media, to calculate a saccade rate associated with said user viewing said content based on said user's eye gazing data collected using an Artificial Intelligence (AI) module;

program instructions, stored on at least one of the one or more computer storage media, to determine a saccade pattern using said saccade rate and an associated saccade pattern data using said AI module to calculate a saccade rate associated with said eye gazing data; wherein said Artificial Intelligence (AI) module uses one or more machine learning models;

program instructions, stored on at least one of the one or more computer storage media, to monitor when said saccade rate falls below a first value with respect to viewing a first area of said content and flag a location for a first subset of said content;

program instructions, stored on at least one of the one or more computer storage media, to monitor when said saccade rate shifts backwards over a second subset and second flagged area of said content one or more times based on said saccade pattern data, and flag said location as a second area of the content; wherein a shift backward is a movement that gazes at least a second time over a set of words or images;

program instructions, stored on at least one of the one or more computer storage media, to emphasize a portion of said content located between said first and said second flagged areas;

program instructions, stored on at least one of the one or more storage media for execution by at least one of the one or more processors via at least one of the one or more memories to determine when a saccade delay is detected and moving across a portion location where the delay is detected a plurality of times using the one or more machine learning models to highlight the portion that is slowing the saccade using one or more tooltips; and program instructions, stored on at least one of the one or more computer storage media, to determine the one or more tooltips that can be provided to said user corresponding to information in said content that falls in said emphasized portion; and program instructions, stored on at least one of the one or more storage media for execution by at least one of the one or more processors via at least one of the one or more memories to determine a difficulty of the one or more sentences based on the saccade pattern data and to provide alternatives using the one or more tooltips.

* * * * *